May 17, 1966 F. E. BUSCHBOM 3,251,454
ENSILAGE CONVEYOR
Original Filed Dec. 8, 1961 2 Sheets-Sheet 1

INVENTOR.
FLOYD E. BUSCHBOM
BY
Moore, White & Burd
ATTORNEYS

May 17, 1966  F. E. BUSCHBOM  3,251,454
ENSILAGE CONVEYOR

Original Filed Dec. 8, 1961  2 Sheets-Sheet 2

INVENTOR.
FLOYD E. BUSCHBOM
BY
Moore, White & Bund
ATTORNEYS

United States Patent Office 3,251,454
Patented May 17, 1966

3,251,454
ENSILAGE CONVEYOR
Floyd E. Buschbom, Long Lake, Minn., assignor to Vandale Corporation, Long Lake, Minn., a corporation of Minnesota
Continuation of application Ser. No. 157,914, Dec. 8, 1961. This application Dec. 3, 1964, Ser. No. 418,373
12 Claims. (Cl. 198—64)

This application is a continuation of application Serial No. 157,914, filed December 9, 1961, now abandoned.

This invention relates to new and useful improvements in conveyor systems for conveying ensilage and the like, and particularly relates to new and useful trough liners adapted for use in conjunction with existing conveyor structure, whereby a simple yet effective conveying means is provided employing a minimum of parts and requiring a minimum of power.

In the design of a common form of ensilage conveyor systems, the material to be conveyed is commonly "augered" along and within a linear extending channel by means of one or more helical flight members on a rotating shaft or shafts. The shaft and helical flighting connected thereto is supported by a plurality of bearing supports or similar means at intervals as needed. Although the bearing supports are generally made as small as possible, their inclination causes substantial impediment to the conveyed ensilage. Thus, not only is such structure expensive to manufacture since more labor and material is required to produce such a conveyor, but also such impeded conveyor has less capacity and consumes substantially more power than desirable. The need and desire to solve this problem have given rise to this invention.

It is therefore an object of this invention to provide a new and useful conveyor system requiring a minimum of parts yet possessing necessary functional strength and capacity to effectively receive, convey and deliver ensilage and the like to utilizable extension.

Another object of this invention is to provide a new and useful trough liner adapted to be used in cooperation with existing conveyor structure whereby a simple, easy and inexpensive attachment quickly converts existing structure to a conveyor system according to this invention.

A further object of this invention resides in the provision of a conveyor system requiring less power and providing greater capacity by the elimination of bothersome wrapping and binding of ensilage and the like around conveyor support bearings.

Still a further object of this invention is the provision of a new and useful conveying system providing a superior distribution of the conveyed material without separation.

Other objects will become apparent as the description proceeds.

To the accomplishments of the foregoing and related ends this invention then comprises the features hereinafter described and particularly pointed out in the claims, the following description setting forth in detail certain illustrative embodiments of the invention, these being, however, but a few of the various ways in which the principles of this invention may be employed.

The invention is illustrated by the drawings in which the same numerals refer to corresponding parts and in which:

FIGURE 1 is an elevational view, partly broken away and partly in section, of the conveyor system according to this invention, in cooperation with an external chute of a silo, bin, or the like;

FIGURE 3 is a fragmentary top plan view of the channel structure of the conveyor system.

Figure 1:
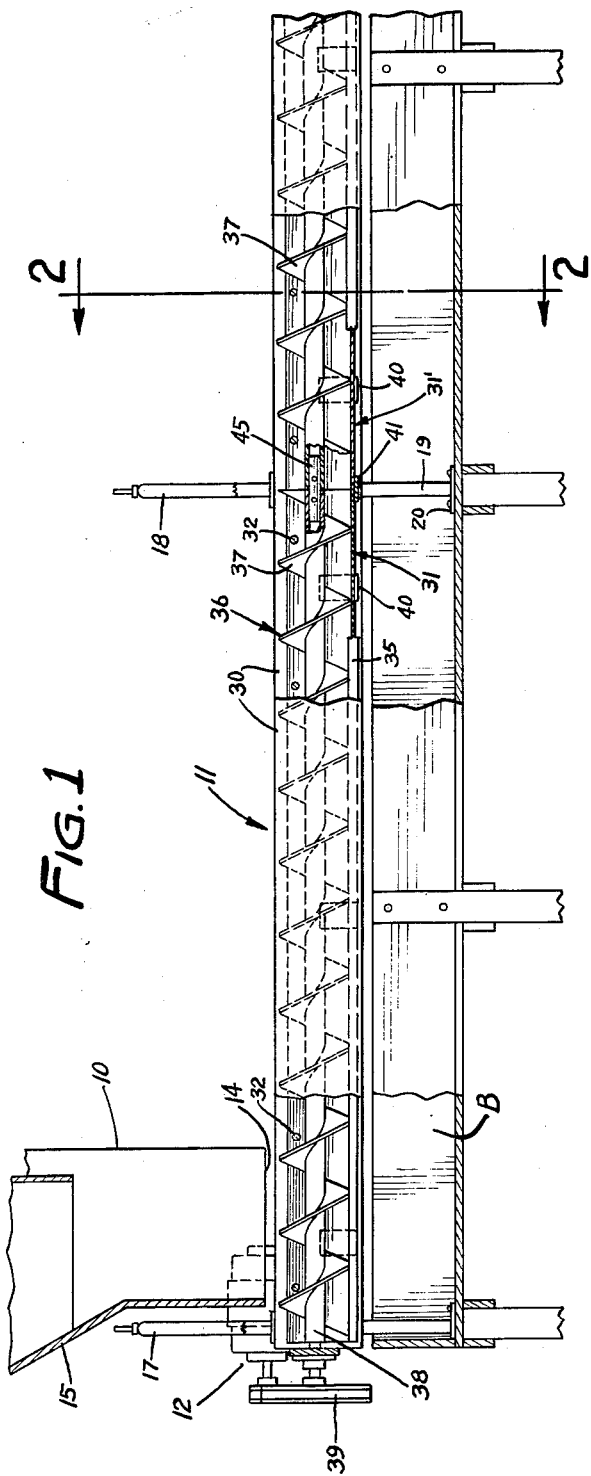

Referring to the drawings, and particularly to FIGURE 1, the conveying means of this invention is shown in conjunction with an external chute 10, such as would be used to guide ensilage or other material being ejected from a silo tank, bin, or the like. The conveying apparatus or means generally designated 11 is supported in linear extension with an upstream end 12 positioned under the bottom 14 of external chute 10 to receive material therefrom and a downstream end, not shown, positioned in extended relation threto. For apparent reasons, the chute 10 may include converging guide members such as 15.

The supporting structure includes opposed U-shaped rigid bar members, such as 17 and 18, which are spaced longitudinally at intervals as needed, the straight portions, thereof, providing a plurality of supporting legs 19. The bases of the supporting legs 19 are provided with flanged members 20 to provide means for mounting the apparatus as desired. As is customary, opposite ends of the flange members 20 are apertured to receive bolts, which fasten the apparatus to a feed bunk B or the like where it is desired to convey ensilage or other material along a longitudinally extending path.

Each upright U-shaped member, for example 18, cooperates with a similarly shaped rigid member 21, which is spaced inwardly due to its smaller design but in the vertical plane of member 18, the straight portions thereof providing inward supporting legs 22. The bases of legs 22 are secured to an opposed pair of L-members 24 by a weld or similar means. L-members 24 are in turn provided with angle guide flange members 25 which being secured to the outside surface of the L-members are thereby interposed between the L-members 24 and supporting legs 19. The guide members 25 are slidable upon legs 29 and provide a positioning means and lateral supporting means for L-members 24 and inner U-shaped member 21 connected thereto.

As is preferred, U-shaped member 18 and U-shaped member 21 are apertured to receive an adjustable bolt member, generally designated 26, which is rigidly fastened at its lower end 27 to a U-shaped member 21 and is threaded at its upper end 28 to connect to U-shaped member 18 by adjustable nut 29. As is apparent, there is thus provided means for adjusting the vertical position of U-shaped member 21 relative to U-shaped member 18, the advantage of which is hereinatter described.

Figure 2:
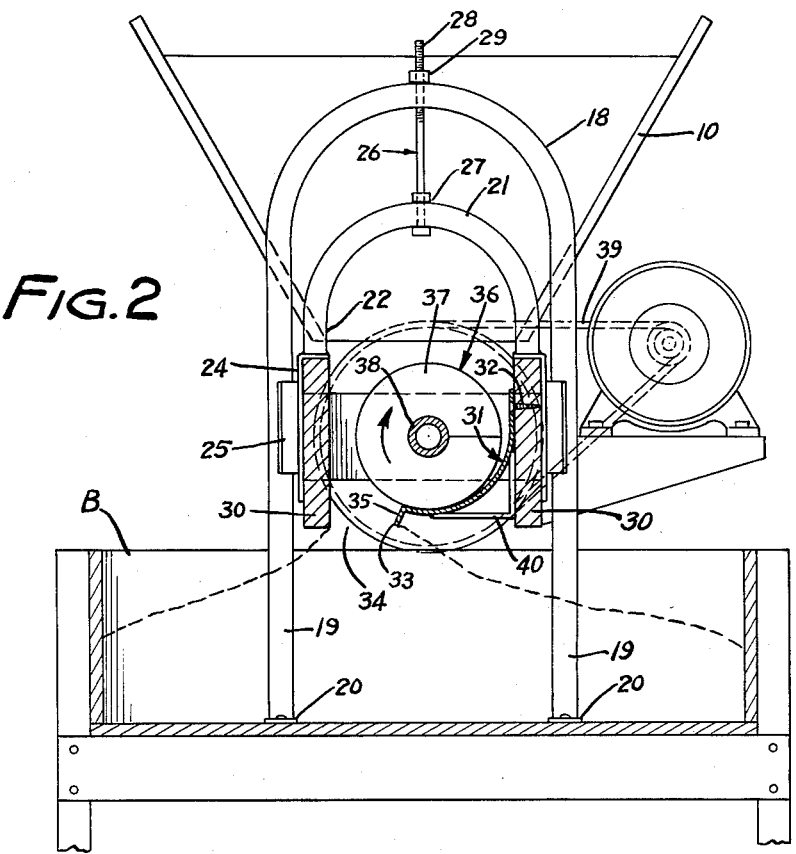
FIGURE 2 is an enlarged view taken on the line 2—2 of FIGURE 1 and in the direction of the arrows.

L-members 24 are further secured to and therefore support an opposed pair of longitudinally extending wooden side members 30 which form part of the channel structure, hereinbelow defined. The channel structure includes side members 30 and a J-shaped trough member 31 secured thereto by wood screws 32 which are spaced at intervals along the channel and engage apertures provided in trough member 31. As shown in FIGURE 2, the trough member 31 is connected at its right upper straight back portion to one of the side members 30, in this embodiment the one on the right. Adjoining the straight back portion, the arcuate portion of the trough member is generally semicircular and includes a linear running edge 33 which terminates a short distance from the other side member which is on the left, thereby providing a longitudinally extending aperture 34 for permitting the ensilage or material to fall below as it is being conveyed. There is optionally provided a downwardly projecting lip flange 35 adjoining edge 33 and extending linearly therewith to provide means for guiding the ensilage to the underlying bunk feeder B and also give strength to trough member 31.

By adjusting the nut 29 of bolt member 26, the operator is able to adjust the vertical height of the channel structure including side members 30, L-members 24, guide flanges 25, and trough member 31 relative to the bunk B. This is especially advantageous where increased ensilage distribution is desired as often times the channel structure needs to be raised as the bunk fills to allow the ensilage to fall to the underlying bunk.

In operation the ensilage or material discharged at the up-stream end is commonly conveyed along the channel by a conveyor 36 comprising a plurality of helical flight members 37 connected to one or more rotating shafts, such as 38, which are driven by suitable drive means 39. Such a conveyor and drive means is well known in the art as shown by a copending application Serial No. 49,468, now Patent No. 3,130,707, incorporated herein by reference. Therefore, such will not be described in further detail.

J-shaped trough member 31 is further supported by a series of rigid angle bars 40 which underlie the trough member at intervals as is needed and secured thereto by a weld. The angle bars 40 are adapted to be secured by well known means to the wooden side members 30. Thus, the trough member 31, or more particularly the arcuate portion thereof, is capable of supporting the conveyor 36. By driving the conveyor 36 in a clockwise direction, as shown, the outer periphery of the helical flight members 37 will bear towards the straight back portion of the trough member and provide a horizontal thrust to the right which is absorbed substantially by the side member 30 supporting the trough. This climbing action by conveyor 36 prevents the conveyor from bearing against the side member 31 on the left. In this manner, the conveyor 36 is fully supported by the J-shaped trough along the channel and there is always provided aperture 34 for permitting the ensilage to fall to feed bunk B.

As is to be greatly appreciated, by supporting the conveyor 36 with the trough 31, there is eliminated the need for any other conveyor supporting means, such as bearing supports which were heretofore commonly spaced at intervals along the channel. Thus, there is provided a conveying channel defined by the periphery of the trough in cooperation with the side members and a conveyor which conveys the ensilage without impediment. Lubrication is provided by the ensilage itself, since the conveyor 36 "floats" upon it throughout the channel. This floating and centralizing action of the conveyor 36 in the J-shaped trough 31 is the result of having the radius of curvature of the bottom arcuate section of the trough substantially larger than the radius of curvature of the helical flight member 37 as shown in FIGURE 2. As illustrated in FIGURE 2 the periphery of the flight member 37 separates from the curved bottom of the trough below the horizontal plane passing through the axis of the conveyor 26. In this manner, the friction between the outer periphery of helical flight members and the trough is not significant.

Figure 4:
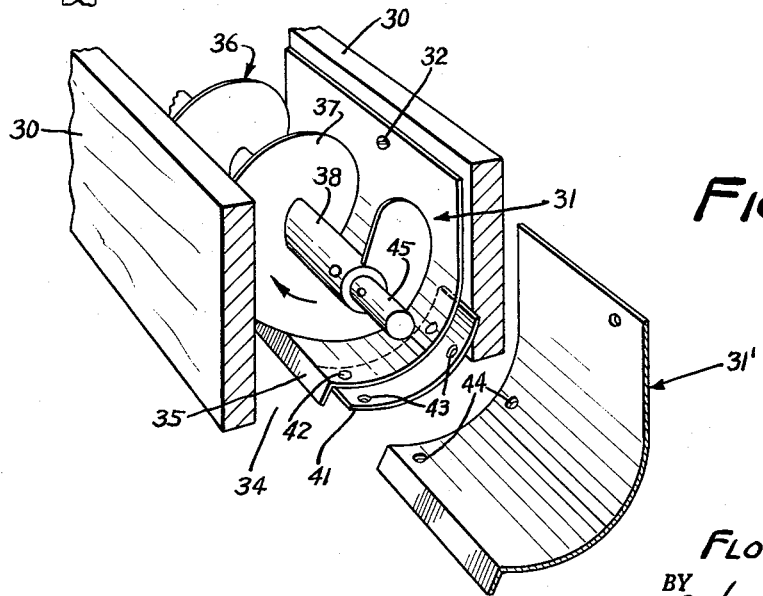
FIGURE 4 is an enlarged perspective view, partially in section and partly broken away, of the channel structure of the conveyor system according to this invention and showing the connecting means whereby adjacent trough members are secured to provide an extended conveyor.

As shown in FIGURE 4, adjacent structures or sections may be securely interconnected by means of lapped flanges 41 at the downstream end and adjacent the arcuate portion of the trough member 31. By means of rivets 42 lap flange 41 is secured to the preceding trough member 31, and is provided with apertures 43 which register with apertures 44 of the adjacent trough member 31' to receive bolts and the like to interconnect the adjacent troughs. Extensions of the conveyor 36 are accomplished by an interconnecting shaft 45 which is bolted at each end to adjacent conveyors, as shown by the incorporated disclosure. There is thus provided means for quickly and easily lengthening the conveyor to any desired length.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A conveyor system for conveying ensilage or the like to a feed surface comprising upright support means for mounting the conveyor system on the feed surface, a pair of opposed horizontally elongated members, frame means secured to said pair of members, means adjustably connecting the frame means to the support means, means secured to at least one side portion of the frame means and slidably engageable with the support means for guiding the frame means and a pair of opposed elongated members for movement in an upright plane on the support means, conveyor means including a helical flight secured to a shaft for rotation thereby, J-shaped trough means having an upright side section connected to one of said members and a curved bottom section having a concave curvature substantially larger than the curvature of the helical flight for supporting a portion of the bottom of the conveyor means said bottom section terminating in an edge spaced from the other of said members to define an elongated opening, and drive means for said conveyor means.

2. A bunk feeder comprising upright support means for mounting the bunk feeder in an elevated position above a feed surface, frame means including a plurality of pairs of spaced apart, rigid, substantially parallel upright members of substantial width and thickness, means adjustably connecting the frame means to the support means for movement in an upright plane, means secured to at least one side portion of the frame means and slidably engageable with the support means for guiding the frame means for movement in said upright plane on the support means, J-shaped trough means secured to one of each of said pairs of members and extended longitudinally thereof throughout their length, said J-shaped trough means being narrower than the spacing of said members, flange means secured to the J-shaped trough means to interconnect adjacent end portions of the J-shaped trough means, reinforcing means secured to said members and to said trough means for supporting bottom sections of the J-shaped trough means at intervals throughout the length thereof whereby said J-shaped trough means derives operating stiffness by reason of being secured to and supported by said upright members, auger means rotatably cradled only in a bottom portion of said J-shaped trough means, said auger means having a peripheral curvature smaller than the curvature of the bottom portion of the J-shaped trough means, and means for rotating said auger means in a direction to cause the auger means to remain in said J-shaped trough means and out of engagement with the upright members to which said J-shaped trough means is secured.

3. The bunk feeder defined in claim 2 further characterized wherein said support means comprises an inverted U-shaped member and said frame means includes an inverted U-shaped member secured to the opposed members.

4. The bunk feeder defined in claim 2 wherein said J-shaped trough means includes a curved bottom section having a concave curvature larger than the curvature of the auger means so that the periphery of the auger means separates from the curved bottom section below the horizontal plane passing through the axis of rotation of the auger means whereby the auger means is supported in a portion of the bottom section of the J-shaped trough means.

5. The bunk feeder defined in claim 2 wherein the curved bottom section of the J-shaped trough means terminates short of the other of said members forming therewith a linearly extended aperture for conveyed ensilage to fall into the feed bunk.

6. A bunk feeder for conveying ensilage or the like to a feed surface comprising support means for mounting the bunk feeder in an elevated position above the feed surface, a pair of spaced apart substantially parallel elongated members, frame means secured to said members for supporting the members in relative spaced relation, means adjustably connecting the frame means to the support means, means slidably engageable with the support means for guiding the frame means and elongated members for movement in an upright plane on the support means, conveyor means including a helical flight secured to a shaft for rotation thereby, J-shaped trough means secured to one of said members and extended in a longitudinal direction over said feed surface, said J-shaped trough means including a curved bottom section having a concave curvature substantially larger than the curvature of the helical flight, said bottom section terminating in an edge spaced from the other of said members defining an elongated opening, flange means secured to the J-shaped trough means to interconnect adjacent end portions of the J-shaped trough means and means for rotating said helical flight in a direction to cause it to remain in the bottom section of the J-shaped trough means.

7. The bunk feeder defined in claim 6 further characterized wherein said support means comprises an inverted-U-shaped member and said frame means includes an inverted-U-shaped member.

8. A conveyor system for conveying ensilage or the like to a feed surface comprising inverted U-shaped support means for mounting the conveyor system on the feed surface, a pair of opposed horizontally elongated members, inverted U-shaped frame members located below and in the planes of the inverted U-shaped support means, means securing opposite portions of said U-shaped frame members to said elongated members; means adjustably connecting the frame means to the support means for movement in an upright plane, guide members secured to said opposite portions of U-shaped frame members and slidably engageable with adjacent portions of the U-shaped support means for guiding the frame members and pair of opposed elongated members for movement in said upright plane, conveyor means including a helical flight secured to a shaft for rotation thereby, J-shaped trough means having an upright side section connected to one of said members and a curved bottom section having a concave curvature substantially larger than the curvature of the helical flight for supporting a portion of the bottom of the conveyor means, said bottom section terminating in an edge spaced from the other of said members to define an elongated opening and drive means for said conveyor means.

9. In a bunk feeder for conveying ensilage or the like to a feed surface, support means for mounting the bunk feeder in an elevated position above the feed surface, a pair of spaced apart substantially parallel upright and elongated flat members, frame means secured to said members for supporting the members in relative spaced relation, upright means adjustably connecting the frame means to the support means, at least one guide member secured to a side portion of the frame means and slidably engageable with the support means for guiding the frame means and the elongated members for movement in an upright plane on the support means, trough means supported by one of said flat members and conveyor means positioned in the trough means for moving ensilage along said trough means and onto said feed surface.

10. A conveyor system for conveying ensilage or the like to a feeding surface comprising support means for mounting the conveyor system on the feed surface, at least one elongated member, frame means secured to said elongated member, means adjustably connecting the frame means to the support means, means secured to a side portion of the frame means and slidably engageable with the support means for guiding the frame means and elongated member for movement in an upright plane on the support means, conveyor means including a helical flight secured to a shaft for rotation thereby, J-shaped trough means having a side section connected to said elongated member and a curved bottom section having a concave curvature substantially larger than the curvature of the helical flight for supporting a portion of the bottom of the conveyor means, and drive means for said conveyor means.

11. A bunk feeder comprising a frame, at least one pair of spaced apart, rigid, substantially parallel upright members with a substantial width and thickness secured to said frame, support means for mounting the frame and upright members in an elevated position above a feed surface, adjustment and guide means connecting the frame means to the support means for movement in an upright direction, J-shaped trough means secured to one of said pair of members and extended longitudinally thereof throughout the length thereof, said J-shaped trough means having a concave curved bottom portion terminating in a linear edge, said trough means being narrower than the spacing of said members defining an elongated opening with the other of said pair of members, rigid reinforcing means secured to the same member to which said J-shaped trough means is secured, said reinforcing means supporting the bottom of said J-shaped trough means at intervals throughout the length thereof whereby said J-shaped trough means derives operating stiffness by reason of being secured to and supported by said member and said rigid reinforcing means, auger means rotatably cradled in a portion of the curved bottom of said J-shaped trough means, said bottom portion having a concave curvature larger than the curvature of the auger means whereby the auger means has limited upright and lateral movement with respect to the trough means, auger means engaging the entire terminating curved portion of the J-shaped trough means and being spaced only from the portion opposite the terminating edge, and means for rotating said auger means in a direction to cause it to remain in said J-shaped trough means and out of engagement with the pair of upright members.

12. In a conveyor system for conveying ensilage or the like to a feed surface, at least one pair of substantially parallel opposed upright members, conveyor means including a helical flight secured to a shaft for rotation, J-shaped trough means having an upright side section connected to one of said members and a curved bottom section having a concave curvature substantially larger than the curvature of the helical flight for supporting a portion of the bottom of the conveyor means between said upright members, said helical flight engaging the entire terminating curved portion of the bottom section and being spaced only from the portion opposite the terminating portion of the side section, said bottom section of the trough means terminating short of the other of said members forming therewith a linearly extended aperture for conveyed ensilage to fall into the feed surface.

References Cited by the Examiner

UNITED STATES PATENTS

| 1,027,432 | 5/1912 | Prinz. |
| 3,103,913 | 8/1963 | Sime _____ 222—412 |
| 3,116,715 | 1/1964 | Krumheuer _____ 198—64 |

SAMUEL F. COLEMAN, *Primary Examiner.*

RICHARD E. AEGERTER, *Examiner.*